United States Patent [19]

Morello

[11] 4,323,406
[45] Apr. 6, 1982

[54] MANUFACTURING PROCESS FOR COVERING PANELS, AND PANELS OBTAINED WITH THIS PROCESS

[76] Inventor: Sergio Morello, Via Passione, 9, Milan, Italy

[21] Appl. No.: 140,088

[22] Filed: Apr. 14, 1980

[30] Foreign Application Priority Data

Apr. 27, 1979 [IT] Italy .................................. 3388 A/79

[51] Int. Cl.³ .......................... B29D 3/00; B29D 9/00
[52] U.S. Cl. ..................................... 156/91; 156/212; 156/245; 264/46.4; 264/46.7; 264/258; 264/263; 264/275; 264/334
[58] Field of Search ............. 264/46.4, 46.7, 257–259, 264/263, 279, 328.1, 275, 337, 338, 339, 271, 267, 334; 156/245, 91, 212, 213, 46.7, 46.4; 249/96, 83, 85

[56] References Cited
U.S. PATENT DOCUMENTS

| | | | |
|---|---|---|---|
| 2,845,997 | 8/1958 | Waite | 264/275 |
| 2,923,978 | 2/1960 | Corzine | 264/257 |
| 3,294,887 | 12/1966 | Altermatt | 264/257 |
| 3,309,449 | 3/1967 | Jansen et al. | 264/257 |
| 3,594,262 | 7/1971 | Magidson | 264/257 |
| 3,763,548 | 10/1973 | Anderson | 264/257 |
| 4,046,611 | 9/1977 | Sanson | 264/257 |

Primary Examiner—Willard E. Hoag
Attorney, Agent, or Firm—Browdy and Neimark

[57] ABSTRACT

Manufacturing process for covering panels, involving the use of a die-counterdie unit in which the die is divided into two separate portions with at least one plate protrusion. The various phases in this procedure comprise the laying of a first sheet on the die surface, with locking by elastic means, of the folded edge of the sheet at the end of said protrusion, followed by the laying of a second sheet adhering to the first and to the remaining part of the die-counterdie unit with pressure injection of synthetic resin in the hollow space between the second sheet and the surface.

4 Claims, 7 Drawing Figures

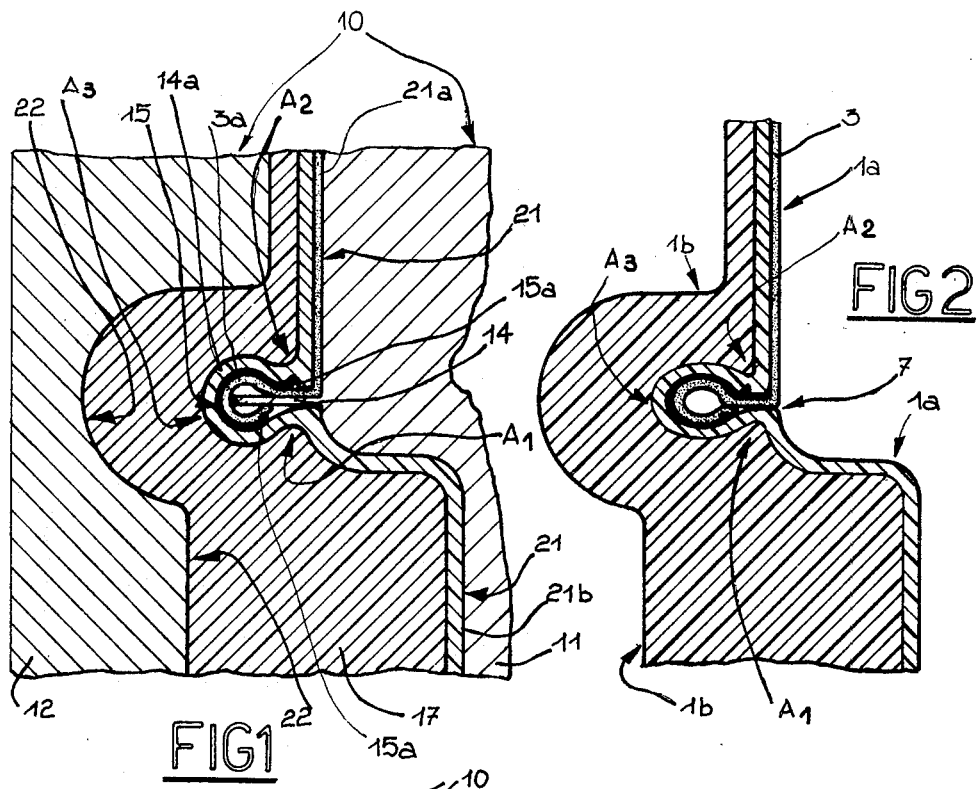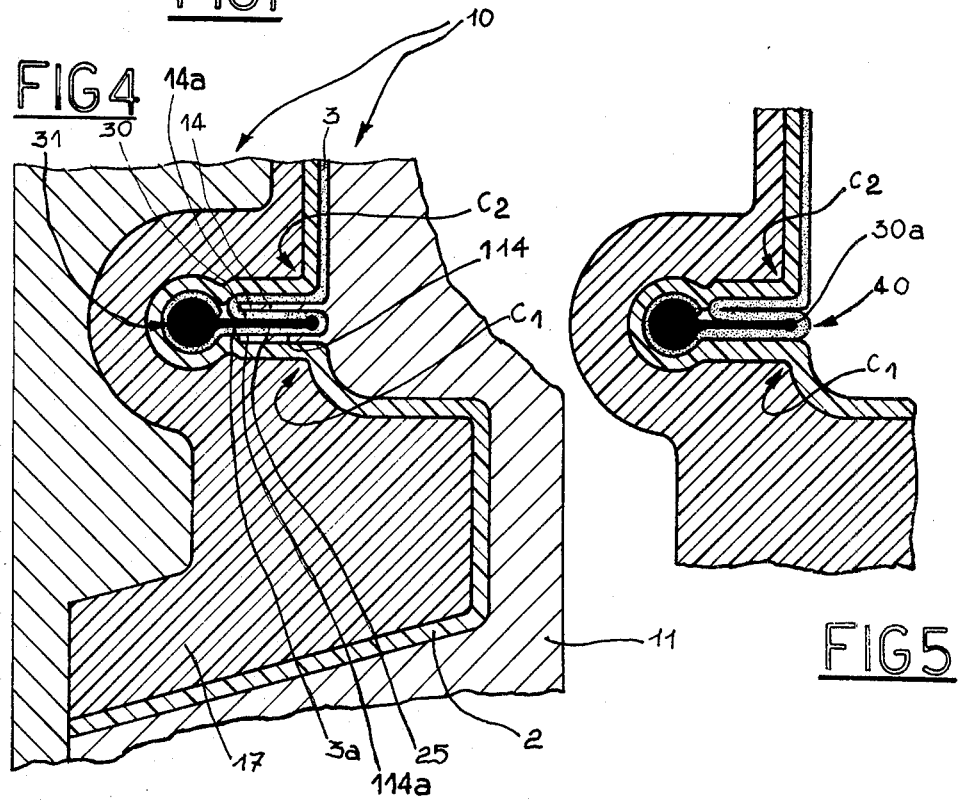

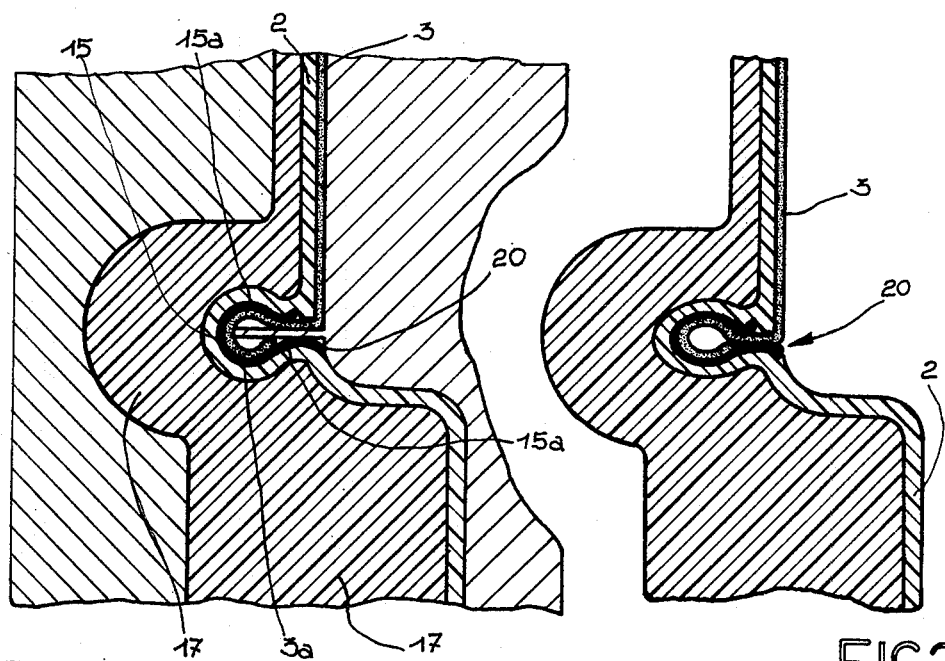
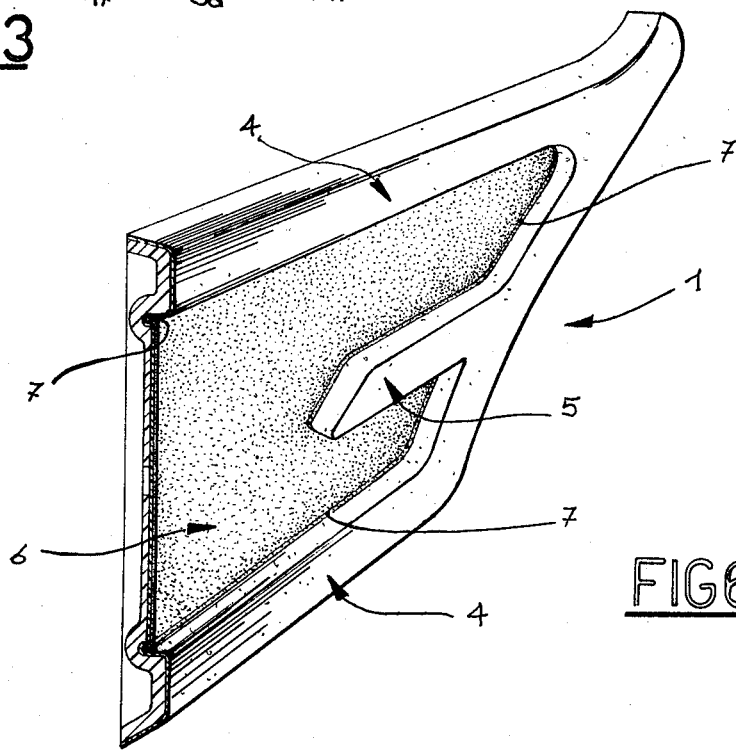

MANUFACTURING PROCESS FOR COVERING PANELS, AND PANELS OBTAINED WITH THIS PROCESS

This invention refers to a manufacturing process for covering panels to cover motor-vehicle doors; this invention also covers the panels obtained with this process.

It is noted that, in motor-vehicles recently issued on the market, many manufacturers use panels to cover motor-vehicle doors, constructed in one piece by means of synthetic resin injection pressing (e.g. with foam polyurethane).

The panel surfaces, destined to remain external, are usually covered by a sheet of synthetic resin (e.g. imitation leather) or cloth; said sheet is made adhere to the panel body either at pressing or following same with the use of suitable adhesives.

Consequently, observers will see that the panels are free from any colour and surface finish variations.

It has been noted from recent market surveys that customers do not find the appearance of the abovementioned type of panels particularly attractive.

To overcome this, manufacturers have produced panels with surfaces, destined to remain external, presenting the outside fascia (together with the armrest and handle) covered by a sheet of waterproof synthetic resin (e.g. imitation leather) of a prefixed colour, while the remaining part of these surfaces is covered by a sheet of cloth (e.g. velvet).

The problem thus arises of making the sheet of cloth adhere to the underlying sheet of synthetic resin by means of adhesives or seams, but both solutions present aesthetic and functional drawbacks.

In fact, the first solution does not allow a solution of continuity between the sheet of cloth and the underlying surface of imitation leather to which the sheet of cloth is glued; also, the sheet of cloth tends to come unstuck with wear and tear.

Due to the fact that the second solution involves seams, a notable amount of labour and machinery is required, which not only has a negative effect on the cost of the panel but also does not guarantee that the prefixed geometry of the line separating the resin sheet from the material sheet will be obtained, also due to the fact that the areas in which these seams must be stitched normally have a concave development.

To prevent the above, the Applicant has invented a manufacturing process with which it is possible to produce covering panels in which the surface destined to remain external is obtained with two or more sheets, in prefixed colours and surface finish, separated, with no solution of continuity, by a continuous line developing to a prefixed geometry.

Another purpose of this invention is to supply a process for manufacturing covering panels, as mentioned above, in which the abovementioned separating line presents prefixed ornamental motifs.

The abovementioned purposes are achieved with this invention which deals with a manufacturing process for covering panels, involving the use of a die-counterdie unit, in which the die surface, defining the outside surface of the corresponding panel, has at least one plate protrusion separating said surface into at least two distinct prefixed portions, said process being characterized by the fact that it forsees the following phases:

(a) laying of a first sheet adhering to a corresponding portion of the die surface until, with the edge of said sheet folded, it is wound round the end of said protrusion;

(b) locking, by elastic means, of the folded edge of the abovementioned sheet at the end of the abovementioned protrusion;

(c) laying of a second sheet adhering to the abovementioned first sheet and to the remaining portion of the surface of said die;

(d) closing of the die-counterdie unit by press-injecting synthetic resin into the hollow space between the abovementioned second sheet and the surface of the counterdie, and the subsequent opening, after a prefixed time, of the abovementioned unit;

(e) detachment of the panel from the die and simultaneous unthreading of the abovementioned protrusion from the folded edge of the first sheet in contrast with the abovementioned elastic means.

To better emphasize further features and advantages of this process, in two of its preferred but non-exclusive forms of construction, two panels are illustrated below, obtained with the abovementioned procedure in its two forms of construction, said panels being illustrated, purely by way of example, in the attached drawings in which:

FIG. 1 illustrates a vertical section of a portion of the die-counterdie unit, with interposed panel, used in the first form of construction of the manufacturing process in question;

FIG. 2 shows the same view of the portion of the panel in FIG. 1 with the same panel removed from the die-counterdie unit;

FIGS. 3 and 3a show the same details as FIGS. 1 and 2 with different elastic locking means;

FIG. 4 shows a vertical section of a portion of the die-counterdie unit, with interposed panel, used in the second form of construction of the manufacturing process in question;

FIG. 5 shows the same view of the panel portion as FIG. 4 with this panel removed from the die-counterdie unit;

FIG. 6 is a perspective view of a covering panel obtained with the process in question, in particular the second form of construction of this process.

In FIG. 6, number 1 indicates a panel to cover a corresponding door (in particular, the rear door of a motorvehicle).

The surface of said panel destined to remain external is covered by a sheet 2 of synthetic resin (e.g. imitation leather) and by a sheet 3 of cloth (e.g. velvet) for the outside fascia 4 (and armrest 5) and for the embedded inside part 6; said sheets 2 and 3 are separated by a line 7 proceeding to a prefixed geometry (in this case, proceeding along the inside corner of the embedded part 6 and along the lower corner of the armrest 5).

The manufacture of the panel 1 according to the two forms of construction in the process in this invention, described below, involves the use of a unit 10 composed of a die 11 and associated counterdie 12.

The surface 21 of the die 11 defines the surface 1a of the panel 1 destined to remain external; the surface 22 of the counterdie 12 defines the surface 16 of the panel 1 destined to remain external.

In the first form of construction in this process, the die 11 has a plate protrusion 14, proceeding identically to the geometry of the abovementioned separating line 7 (see FIGS. 1, 2 and 3 from which it is evident that the protrusion 14 is developed in correspondence to the inside corner of the inner embedded part, and 6); the abovementioned plate 14 separates the surface 21 of the die 11 into two portions 21a and 21b defining for the panel 1 the abovementioned outside fascia (and armrest 5) and the embedded part 6.

To manufacture the panel 1, the process in question (1st form of construction) involves the following phases:

(a) Laying of the sheet 3 of cloth (e.g. velvet) adhering to the abovementioned portion 21a; the size of this sheet must be such that, with the edge 3a of the same sheet folded, it can envelop the end 14a of the plate 14 (FIGS. 1, 2 and 3).

(b) Locking, by elastic means, of the abovementioned folded edge 3a to the abovementioned end 14a of the plate 14; the abovementioned elastic means are composed of a section 15 with mainly "$\Omega$" (omega-shaped) section with the appendixes 15a of unequal length; the abovementioned section is construction of elastically deformable material (e.g. synthetic or metal resin) and is forcedly wound round the abovementioned folded edge 3a; in this way, due to elastic reaction, the appendixes 15a of the section 15 keep the adjacent strips of the abovementioned edge pressed against the end 14a wound in the same edge.

(c) Laying of the abovementioned sheet 2 of synthetic resin adhering to the sheet 3 and to the remaining portion 21b of the surface 21 of the die 11.

(d) Closing of the unit 10 by press injection of synthetic resin (e.g. foam polyurethane) in the hollow space 17 defined by one side of the abovementioned sheet 2 and the other side of the surface 22 of the counterdie 12.

The expansion reaction of the foam polyurethane gives rise to a practically uniform pressure on the sheet 2; in this way the same sheet is perfectly identical to the die in the portion 21b and is also tightly adhered to the plate 14 (portion $A_1$), the section 15 (portion $A_3$), the part of the sheet 3 adhering to the same plate (portion $A_2$) and the remaining part of the same sheet 3.

The pressure exerted by the sheet 2 on the underlying sheet 3 makes the latter adhere perfectly to the underlying portion 21a of the die; furthermore, the sheet 3 is slightly stretched, which does not prejudice integrity as the section 15, elastically locking the edge 3a, does not prevent the latter sliding slightly during the first phase following synthetic resin injection.

The hardening reaction of the form, which follows expansion, stabilizes the situation and also leads to the formation of the panel structure, coinciding with the void imprint of the abovementioned hollow space 17. After a prefixed time sufficient for the abovementioned reactions to take place, the unit 10 is opened; the panel 1 thus obtained remains attached to the die 11 thanks to the plates 14 clamped in it.

(c) Detachment of the die panel in such a way as to cause unthreading of the protrusion 14 from the folded edge 3a of the sheet 3; this may be obtained by overcoming the elastic reaction of the appendixes 15a of section 15. On completion of unthreading, the space previously occupied by the plate 14 corresponding to the line 7 separating the sheets 2 and 3 is filled by the portions $A_1$ and $A_2$ of the sheet 2, which, precompressed during injection pressing, stick closely together due to elastic reaction; also the edge 3a of the sheet 3 remains stably blocked within the section 15 which is in turn stably wound in close adherence to the portion $A_3$ of the sheet 3.

To sum up, the action of the section 15 and of the portions $A_1$, $A_2$ and $A_3$ of the sheet 2 make it possible to keep the sheet 3 taut and perfectly in place; in this way the embedded part 6 of the surface of the panel 1 destined to remain external is covered in velvet and the remainder in imitation leather.

To conclude, with this process panels are constructed with the desired aesthetic appearance which is maintained by the stability of edge anchoring of the sheet of cloth inside the panel body.

In the version shown in FIGS. 3 and 3a, the section 15 has an appendix 15a, located on the same part of the end of the edge 3a of the sheet 3, of such a length that the end 20 of the same appendix engages against the surface 21 of the die 11; therefore, when the panel is obtained, a cord is visible along the separating line 7, identical to the abovementioned end 20.

In the second form of construction of this process (see FIGS. 4 and 5) a second plate protrusion 114 is foreseen alongside the plate protrusion 14 (mentioned in the first form of construction), equal to the previous one and parallel to same; the abovementioned plate protrusions 14 and 114 define a groove 25.

In said second form of construction, the edge 3a of the sheet 3 must be wound round the ends 14a and 114a of the abovementioned plates and must, at the same time, adhere to the surface of the groove 25.

The edge 3a is locked at the abovementioned plates by means of a key 30 engaged in said groove (FIG. 4); said key is constructed in a section 31 (in synthetic or metal resin) elastically deformable; the terminal part of said edge 3a is wound on the upper rounded part of said section.

After panel pressing, when removing this panel from the die 11, the space between the plates 14 and 114 is immediately filled by the portions $C_1$ and $C_2$ of the sheet 2, as, due to elastic precompression reaction during injection pressing, these portions tend to dilate, acting as described above.

The combined action of the key 30 and the portions $C_1$ and $C_2$ makes it possible to keep the sheet 3 taut and perfectly in place; in this way (similarly to the first form of construction), the surface of the embedded part 6 of the panel surface destined to remain external is covered in velvet and the remaining part in imitation leather.

In the second form of construction, a cord 40 in velvet is visible along the abovementioned separating line 7 (FIGS. 5 and 6) which is identical to the portion of this velvet wound around the end 30a of the key 30; the positive effect of said cord on the panel's aesthetic appearance is evident. From the above it results that the process in question, in both forms of construction, fulfils the purposes in the introduction; indeed, the abovementioned process makes it possible to obtain, without the use of seams or adhesives, panels externally covered partly in synthetic resin sheet and the remainder in cloth, according to a prefixed ornamental design; the abovementioned procedure also makes it possible to construct panels in which the line separating the sheet of synthetic resin from the sheet of cloth presents the prefixed ornamental motif, with no effect on panel functionality.

All the above, given by way of example and unlimitatively, may, however, be varied, adapted or combined, without diverging from the protective ambit of the invention described above and claimed below.

I claim:

1. A process for covering a panel, including use of a die-counterdie unit (10) in which a surface (21) of a die (11), defining the outside surface of the corresponding panel (1), has at least one plate protrusion (14) separating the die (21) into at least two prefixed portions, comprising:
   (a) adhering a first sheet (3) to one of the portions (21a) of the die surface (21), such that the edge (3a) of said first sheet folds over and envelops the end (14a) of said protrusion (14);
   (b) securing by elastic means, the folded edge (3a) of said first sheet at the end (14a) of said protrusion (14);
   (c) adhering a second sheet (2) to said first sheet (3) and the remaining portion (21b) of said die surface (21);
   (d) closing the die-counterdie unit (10), and injecting synthetic resin into a hollow space (17) between the said second sheet (2) and the surface (22) of the counterdie (12);
   (e) opening, after a prefixed time, said unit; and
   (f) detaching the panel from the die with simultaneous removal of said protrusion from the folded edge of said first sheet, leaving said elastic means within said panel.

2. A process according to claim 1, wherein the elastic means in step (b) is composed of a section (15), of elastically deformable material in a substantially omega-shaped section, forcedly positioned around the folded edge (3a) of said first sheet (3).

3. A process according to claim 1, wherein said die has at least two plate protrusions (14-114) of equal height delimiting a constant width groove (25); wherein, in said step (a), said first sheet is adhered to said surface portion such that the edge of said first sheet is folded over the ends (14a-114a) of at least one of said plate protrusions and simultaneously inserted in said groove (25), the portion inserted into said groove adhering to the surfaces defining said groove; and wherein the elastic means in said step (b) is composed of a section (31), elastically deformable, presenting a key (30) which is forcedly engaged in said groove (25) to such a depth that the surface of the die (11) engages the portion of said first sheet (3) wound around the end of said key (30).

4. A process according to claim 2, wherein said omega-shaped section (15) is provided with an appendix (15a) on the side of the terminal part of the folded edge of said first sheet, said appendix being so long that the tip end (20) thereof touches the surface (21) of the die (11).

* * * * *